United States Patent
Maynard

(10) Patent No.: US 7,188,856 B2
(45) Date of Patent: Mar. 13, 2007

(54) VEHICLE TOWING APPARATUS

(75) Inventor: Hansel Maynard, Richmond, KY (US)

(73) Assignee: H&R, LLC, Richmond, KS (US)

( * ) Notice: Subject to any disclaimer, the term of this patent is extended or adjusted under 35 U.S.C. 154(b) by 0 days.

(21) Appl. No.: 11/194,284

(22) Filed: Aug. 1, 2005

(65) Prior Publication Data

US 2007/0024024 A1   Feb. 1, 2007

(51) Int. Cl.
  B62D 43/02   (2006.01)
  B62D 53/04   (2006.01)
  B60P 3/07   (2006.01)
(52) U.S. Cl. .................. 280/402; 414/462; 414/463
(58) Field of Classification Search ........... 280/402; 414/462, 463
  See application file for complete search history.

(56) References Cited

U.S. PATENT DOCUMENTS

| | | | | |
|---|---|---|---|---|
| 3,366,256 A | * | 1/1968 | Meredith et al. | 414/462 |
| 3,428,332 A | * | 2/1969 | McCance | 280/402 |
| 3,430,983 A | * | 3/1969 | Jones | 280/402 |
| 3,458,073 A | * | 7/1969 | Dawson | 414/462 |
| 3,655,082 A | * | 4/1972 | Garrett | 414/462 |
| 3,740,074 A | * | 6/1973 | Coil | 280/402 |
| 3,754,672 A | * | 8/1973 | Blomquist et al. | 414/462 |
| 3,764,163 A | * | 10/1973 | Ortman et al. | 280/292 |
| 3,776,275 A | * | 12/1973 | Bane | 280/292 |
| 3,778,087 A | * | 12/1973 | Kallenbach | 280/292 |
| 3,785,517 A | * | 1/1974 | Brajkovich | 414/462 |
| 3,822,898 A | * | 7/1974 | Brownlie | 280/402 |
| 3,963,129 A | * | 6/1976 | Clayton | 414/563 |
| 3,997,186 A | * | 12/1976 | Pottorff | 280/402 |
| 4,243,243 A | * | 1/1981 | Edmisten | 280/455.1 |
| 5,123,802 A | * | 6/1992 | Bell | 414/563 |
| 5,145,308 A | * | 9/1992 | Vaughn et al. | 414/462 |
| 5,352,083 A | * | 10/1994 | Roberts et al. | 414/477 |
| 5,366,338 A | * | 11/1994 | Mortensen | 414/563 |
| 5,462,398 A | * | 10/1995 | Hymer | 414/462 |
| 5,518,260 A | * | 5/1996 | Grignon | 280/402 |
| 5,531,560 A | * | 7/1996 | Bartholomew | 414/563 |
| 5,620,197 A | * | 4/1997 | Howes | 280/402 |
| 5,674,044 A | * | 10/1997 | Ranes | 414/563 |
| 5,697,629 A | * | 12/1997 | Guild | 280/402 |
| 5,906,386 A | * | 5/1999 | Baker et al. | 280/404 |
| 5,938,226 A | * | 8/1999 | Transchel | 280/402 |
| 5,984,339 A | * | 11/1999 | Guild | 280/402 |
| 6,099,012 A | * | 8/2000 | Mortimer | 280/402 |

(Continued)

Primary Examiner—Lesley D. Morris
Assistant Examiner—Marc A. Scharich
(74) Attorney, Agent, or Firm—Stoll Keenon Ogden PLLC; David J. Clement; Mark A. Taylor

(57) ABSTRACT

An apparatus for towing at least one wheeled vehicle includes a frame including at least one generally vertically oriented support member and at least one generally horizontally oriented support member, the horizontal support member being at least partially hollow and formed with a ramp in a distal end thereof; a mounting arrangement for selectively mounting the frame to a towing vehicle; a vehicle support assembly for receiving and holding a vehicle tire, including at least one generally curved forward tire support member mounted to the horizontal frame member, and a rear support assembly, the rear support assembly including a generally L-shaped frame and a generally curved aft tire support member for removable telescopic engagement with the horizontal support member; and a lifting assembly for moving the vehicle support assembly generally vertically between a first position for loading a vehicle and a second position for towing a vehicle.

19 Claims, 6 Drawing Sheets

U.S. PATENT DOCUMENTS

| | | | |
|---|---|---|---|
| 6,244,813 B1 * | 6/2001 | Cataldo | 414/462 |
| 6,352,401 B1 * | 3/2002 | LeMay | 414/463 |
| 6,581,954 B2 * | 6/2003 | Chadwick | 280/491.1 |
| 6,651,996 B1 * | 11/2003 | Allemang | 280/402 |
| 6,682,292 B2 * | 1/2004 | Estes | 414/462 |
| 6,786,693 B1 * | 9/2004 | Neale | 414/462 |
| 6,935,619 B2 * | 8/2005 | Chamoun | 254/10 B |
| 2002/0154980 A1 * | 10/2002 | Potts | 414/462 |
| 2006/0029490 A1 * | 2/2006 | Raines | 414/462 |
| 2006/0062657 A1 * | 3/2006 | Davis et al. | 414/462 |

\* cited by examiner

VEHICLE TOWING APPARATUS

BACKGROUND OF THE INVENTION

The present invention relates generally to devices and apparatus for towing vehicles over roadways using other vehicles and, more particularly, to an apparatus for towing a motorcycle or other wheeled vehicles with at least one wheel supported by the apparatus and the other wheel providing rolling ground support.

Transporting motorcycles and all-terrain vehicles, either three- or four-wheeled, can be a difficult task, an expensive task or both. While the present invention is primarily used to transport motorcycles, and the present discussion is primarily directed thereto, it should be understood that multiple wheel cradles, spaced a predetermined distance apart can be used in accordance with the present invention to transport other wheeled vehicles, as will be seen in greater detail hereinafter. One way to transport such vehicles is in the bed of a pickup truck which is inexpensive yet tiresome for the driver if the vehicle is large, heavy or both. Another method for transporting such vehicles is a conventional trailer that will support one or more vehicles. Such trailers can be expensive and in some states must be licensed and inspected for highway use. Further, driving a truck or car while towing a trailer takes a certain amount of skill. With diminishing skill from driver to driver, the risk to motorcycle, towing vehicle and all occupants increases.

Another solution has been to provide a device for supporting the front wheel of a motorcycle, scooter, ATV or other wheeled vehicle at a vertically spaced disposition from the roadway and allowing the rear wheel of the motorcycle to roll along the roadway to support the vehicle in conjunction with the front wheel support apparatus.

In the world of such towing techniques and apparatus, there exists a need for such a towing device that will enhance the ease of use and provide ample structural support for substantially any motorcycle or other wheeled vehicle carried thereon. The present discussion will be primarily confined to motorcycles, except where necessary to note the possibility of hauling other wheeled vehicles.

SUMMARY OF THE INVENTION

It is accordingly an object of the present invention to provide a wheeled vehicle towing apparatus which provides an enhanced ease of engagement of the vehicle with the apparatus.

It is another object of the present invention to provide a motorcycle towing apparatus which provides an enhanced ease of engagement of the motorcycle with the apparatus.

It is another object of the present invention to provide such a towing apparatus that will accommodate a variety of motorcycles, scooters or other wheeled vehicles.

These and other objectives are achieved with an apparatus for towing at least one wheeled vehicle, said apparatus including a frame including at least one generally vertically oriented support member and at least one generally horizontally oriented support member. The horizontal support member is at least partially hollow and formed with a ramp in a distal end thereof for enhanced ease of engaging a motorcycle with the towing apparatus for towing. Also included is a mounting arrangement, mounted to the frame, for selectively mounting the frame to a towing vehicle and including a device for cooperative engagement with a towing vehicle. Further included is a vehicle support assembly for receiving and holding a vehicle tire, including at least one generally curved forward tire support member mounted to the horizontal frame member, and a rear support assembly, the rear support assembly including a generally L-shaped frame and a generally curved aft tire support member. The L-shaped frame is configured for removable telescopic engagement with the horizontal support member. The present invention also includes a lifting assembly for moving the vehicle support assembly generally vertically between a first position for loading a vehicle and a second position for towing a vehicle.

It is preferred that the forward tire support member and the aft tire support member are each formed with a curvature approximating a tire curvature. It is further preferred that the present apparatus for towing at least one vehicle include first and second side rails mounted to the horizontal support member with the forward tire support member therebetween for enhanced stability during vehicle support. The present apparatus also preferably includes a stabilizer bar extending horizontally across the frame along an imaginary line substantially normal to the horizontal support member configured for receiving at least one stabilizing cord extending between a vehicle and the stabilizer bar. Preferably, the stabilizer bar is formed in multiple, telescoping sections for releasably fastening the stabilizer bar at a predetermined length. In addition, a second vehicle support assembly may be mounted to the stabilizer bar, and, optionally, a third vehicle support assembly may be mounted to the stabilizer bar. When used for towing four wheeled vehicles, two support assemblies are required and are mounted to the stabilizer bar at a predetermined spacing corresponding with the distance between front wheels of the towed vehicle. Multiple stabilizer assemblies may be used at selected spacing for towing more that one motorcycle.

It is preferential that the lifting assembly include a toothed rack mounted to the horizontal support member and extending in a generally parallel relationship with the vertical support member and a traveling support member mounted to a toothed rack. The traveling support member includes a housing and at least one pinion disposed within the housing for operational engagement with the toothed rack, and a handle fixed to the pinion for manual rotation thereof to drive the pinion along the rack to selectively move the traveling support member with the horizontal support member and the vehicle support assembly vertically between the loading position and the towing position.

Preferably, the lifting assembly includes a traveling support member attached to the horizontal support member and a fluid operated piston and cylinder arrangement operatively connected to the traveling support member to selectively move the traveling support member with the horizontal support member and the vehicle support assembly vertically between the loading position and the towing position.

The present invention may also be described as an apparatus for towing at least one motorcycle including a frame including at least one generally vertically oriented support member and at least one generally horizontally oriented support member. A mounting arrangement is also included and is mounted to the frame for selectively mounting the frame to a towing vehicle, including a device for cooperative engagement with a towing vehicle. Also included is a motorcycle support assembly for receiving and holding a motorcycle tire, including at least one generally curved forward tire support member mounted to the horizontal frame member, and a rear support assembly. The rear support assembly includes a generally L-shaped frame and a generally curved aft tire support member, the L-shaped frame configured for removable telescopic receipt in the horizontal support member. Further included is a lifting assembly including a toothed rack mounted to the horizontal support member and extending in a generally parallel relationship with the vertical support member, a traveling support member mounted to a toothed rack, the traveling support member including a housing and at least one pinion disposed within the housing for operational engagement with the toothed rack, and a handle fixed to the pinion for manual rotation thereof to drive the pinion along the rack to selectively move the motorcycle support assembly generally vertically between the loading position and the towing position.

Preferably, the horizontal support member is at least partially hollow and formed with a ramp in a distal end thereof for enhanced ease of engaging a motorcycle with the towing apparatus for towing.

It is further preferred that the forward tire support member and the aft tire support member are each formed with a curvature approximating a motorcycle tire curvature. Also, preferentially included are first and second side rails mounted to the horizontal support member with the forward tire support member therebetween for enhanced motorcycle support.

The present invention preferably further includes a stabilizer bar extending horizontally across the frame along an imaginary line substantially normal to the horizontal support member configured for receiving at least one stabilizing cord extending between a motorcycle and the stabilizer bar.

The present invention may also be described as an apparatus for towing at least one motorcycle including a frame having at least one generally vertically oriented support member and at least one generally horizontally oriented support member; a mounting arrangement mounted to the frame, for selectively mounting the frame to a towing vehicle, including a device for cooperative engagement with a towing vehicle; and a motorcycle support assembly for receiving and holding a motorcycle tire, including at least one generally curved forward tire support member mounted to the horizontal frame member, and a rear support assembly. The rear support assembly includes a generally L-shaped frame and a generally curved aft tire support member, the L-shaped frame configured for removable telescopic receipt in the horizontal support member. Also included is a lifting assembly including a traveling support member attached to the horizontal support member and a fluid operated piston and cylinder arrangement operatively connected to the traveling support member to selectively move the motorcycle support assembly generally vertically between the loading position and the towing position.

Preferably, the horizontal support member is at least partially hollow and formed with a ramp in a distal end thereof for enhanced ease of positioning a motorcycle on the towing apparatus for towing.

It is preferable that the forward tire support member and the aft tire support member are each formed with a curvature approximating a motorcycle tire curvature.

The present invention may also include first and second side rails mounted to the horizontal support member with the forward tire support member therebetween for enhanced motorcycle support.

Further, the present invention preferably includes a stabilizer bar extending horizontally across the frame along an imaginary line substantially normal to the horizontal support member configured for receiving at least one stabilizing cord extending between a motorcycle and the stabilizer bar.

By the above, the present invention provides a rugged apparatus for efficiently and conveniently transporting one or more wheeled vehicles by towing. Further, the apparatus may be partially disassembled for shipment or transporting when not used for towing.

DESCRIPTION OF THE PREFERRED EMBODIMENTS

Figure 1:
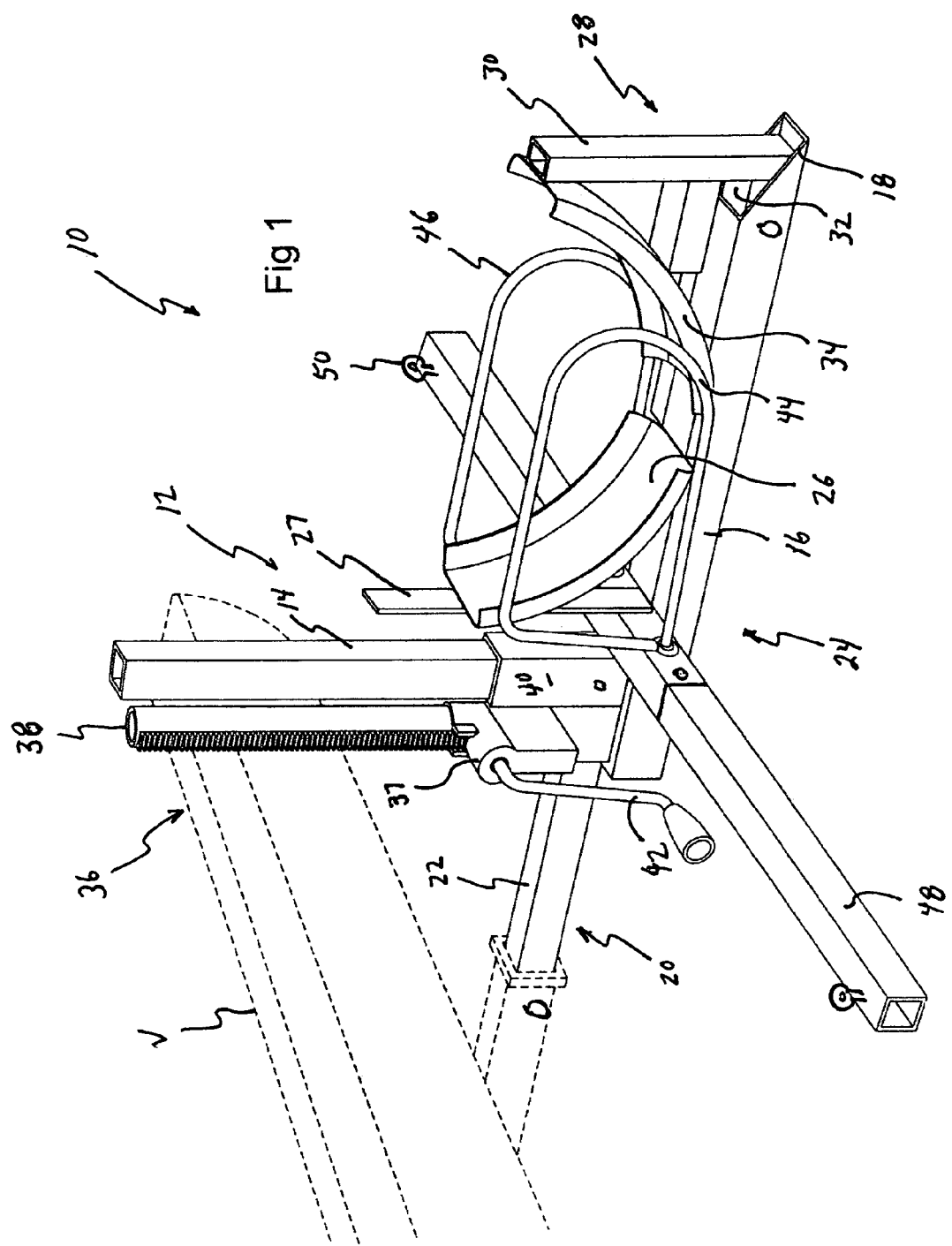
FIG. 1 is a perspective view of the vehicle towing apparatus according to one preferred embodiment of the present invention.

Turning now to the drawings and, more particularly, to FIG. 1, the towing apparatus for vehicles is illustrated generally at 10 and includes a frame 12 formed from a generally vertically extending support member 14 and a generally horizontally extending support member 16. The vertical support member 14 and the horizontal support member 16 are joined at two respective ends thereof to form a generally L-shaped structure. The structure is oriented in a manner such that the horizontal support member is in alignment with the direction of travel of the towing vehicle V.

For clarity, the following discussion of the structural aspects of the present invention will focus on motorcycle towing. Nevertheless, it should be understood that such focus on motorcycles does not act to limit the present invention to such use. Indeed, it will be seen by those skilled in the art that the present invention is useful for towing several types of vehicles.

As will be seen in greater detail hereinafter, engagement of a motorcycle with the present invention is enhanced by a ramp 18 formed at the distal end of the horizontal support member 16 to allow the motorcycle wheel to easily roll up onto the horizontal support member and ultimately the vehicle or motorcycle support assembly as will be explained in greater detail hereinafter.

The present invention is configured for mounting to a conventional receiver for towing assembly attached to a towing vehicle. This mounting arrangement is illustrated at 20 and includes a generally elongate horizontal beam 22 extending rearwardly from the L-shaped frame structure 12 for telescopic receipt by the receiver of the vehicle V.

The present invention also includes a motorcycle support assembly illustrated generally at 24 and is formed in conjunction with the horizontal support member 16. The motorcycle support assembly 24 includes a generally curved forward tire support 26 which is formed as a curved trough with the width of the trough being slightly wider than a conventional motorcycle tire and the curvature of the trough approximating the curvature of the motorcycle tire. The width and curvature of the trough may be varied during manufacture as necessary to accommodate whatever sort of vehicle tire is desired for towing. The forward support 26 is mounted to both the horizontal support member and a generally planar vertically extending support illustrated at 27. A pair of siderails 44 and 46 extends from a position adjacent the junction of the vertical support member 14 and horizontal support member 16 to curve upwardly and outwardly to a smooth curvature in a parallelly extending manner on either side of the forward tire support 26 to a position adjacent a rear support assembly 28. An alternate configuration for the siderails is illustrated in FIG. 6.

The forward support 26 and the horizontal support member 16 cooperate to accommodate the rear support assembly 28. The rear support assembly 28 includes a generally L-shaped frame formed from a vertically extending support 30 and a horizontally extending support 32. The vertically extending support 30 supports an aft tire support member 34 which is formed as a curved trough similar to the forward tire support member 26. As will be seen in greater detail hereinafter, the rear support assembly is removable from the remainder of the towing apparatus to provide access to the ramp 18 for enhanced ease of loading a motorcycle.

Figure 2:
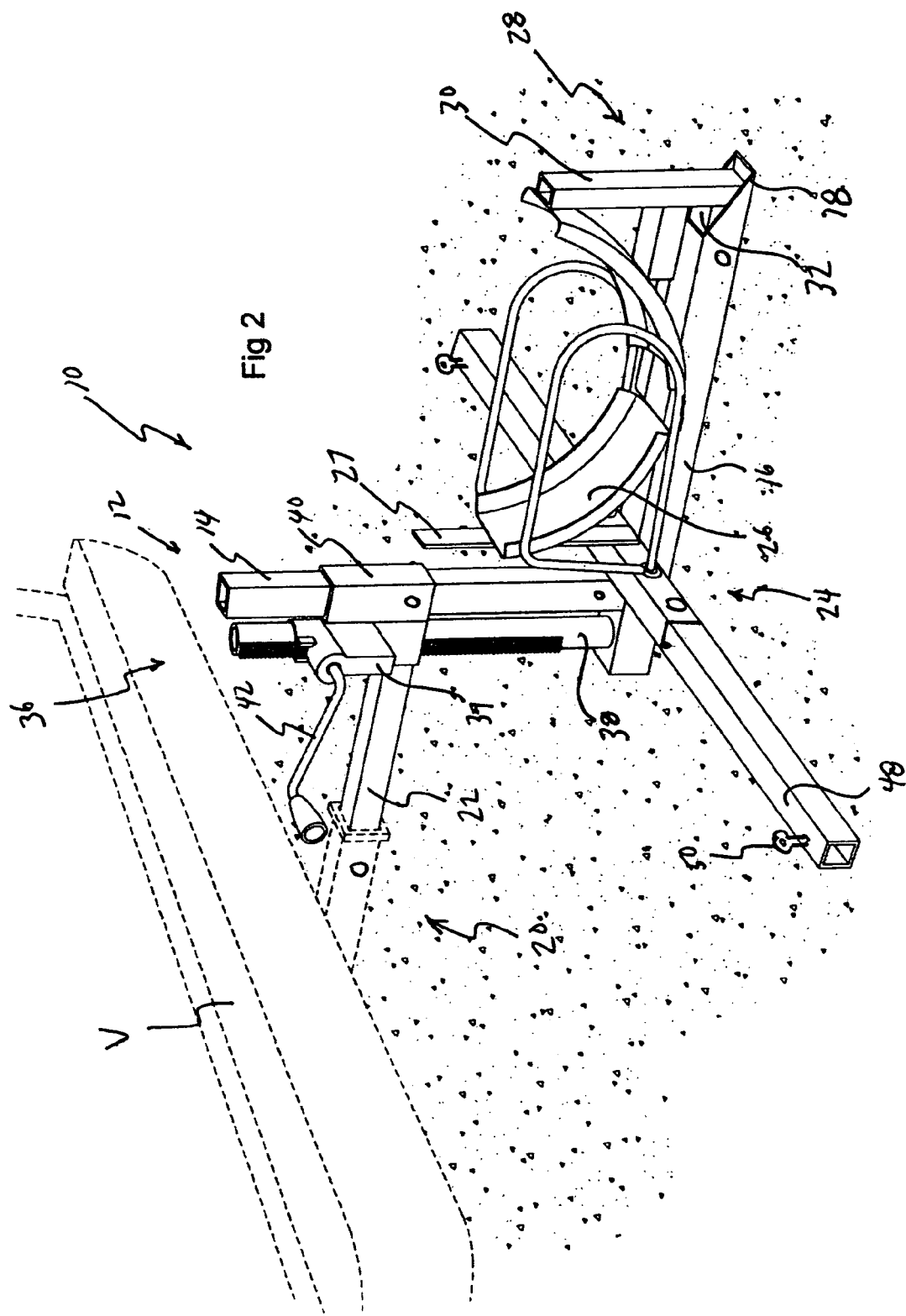
FIG. 2 is a perspective view of the vehicle towing apparatus illustrated in FIG. 1 at a lowered position.
Figure 3:
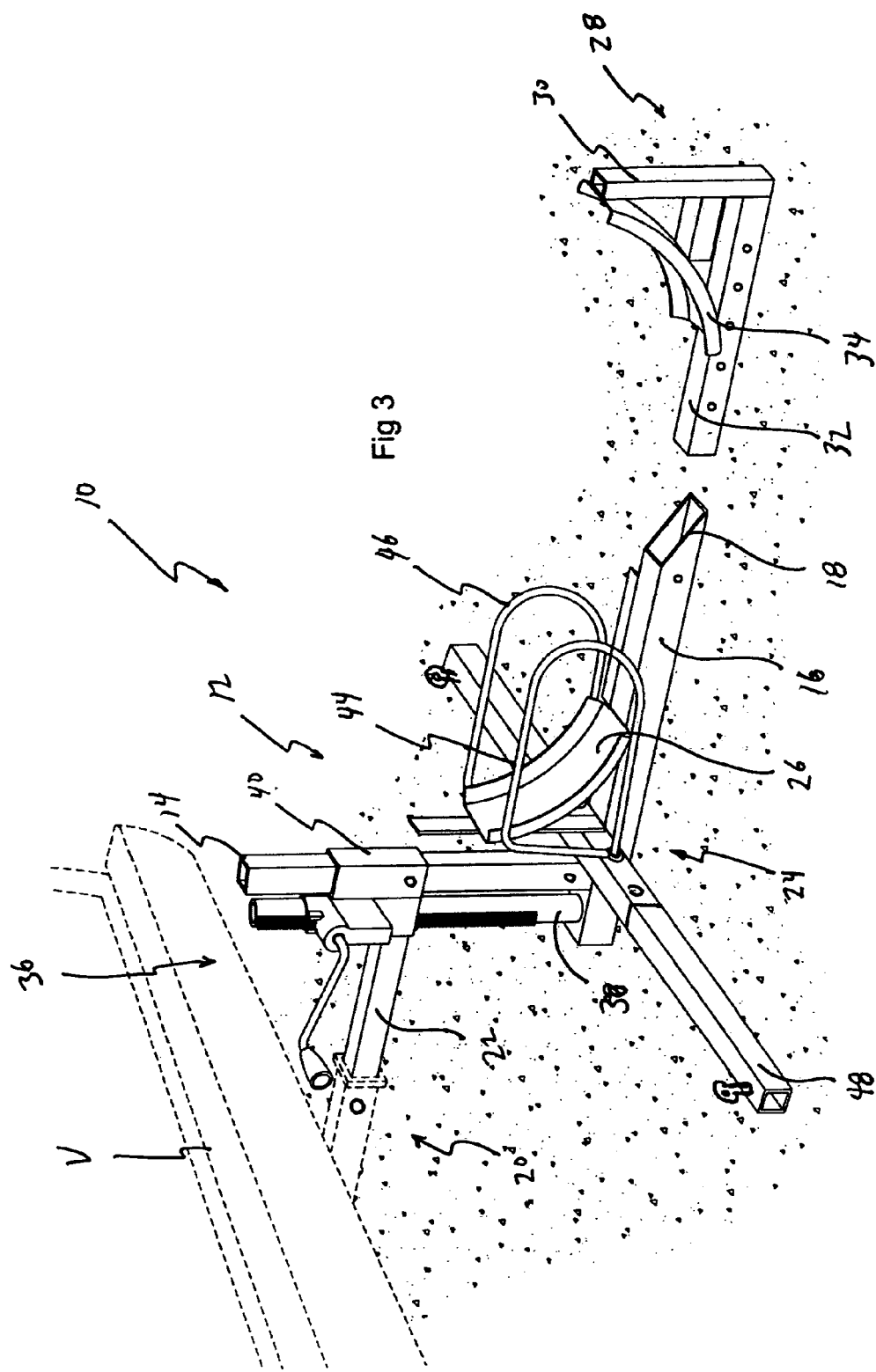
FIG. 3 is a perspective view of the vehicle towing apparatus illustrated in FIG. 2 with the rear support assembly dismounted for motorcycle loading.
Figure 4:
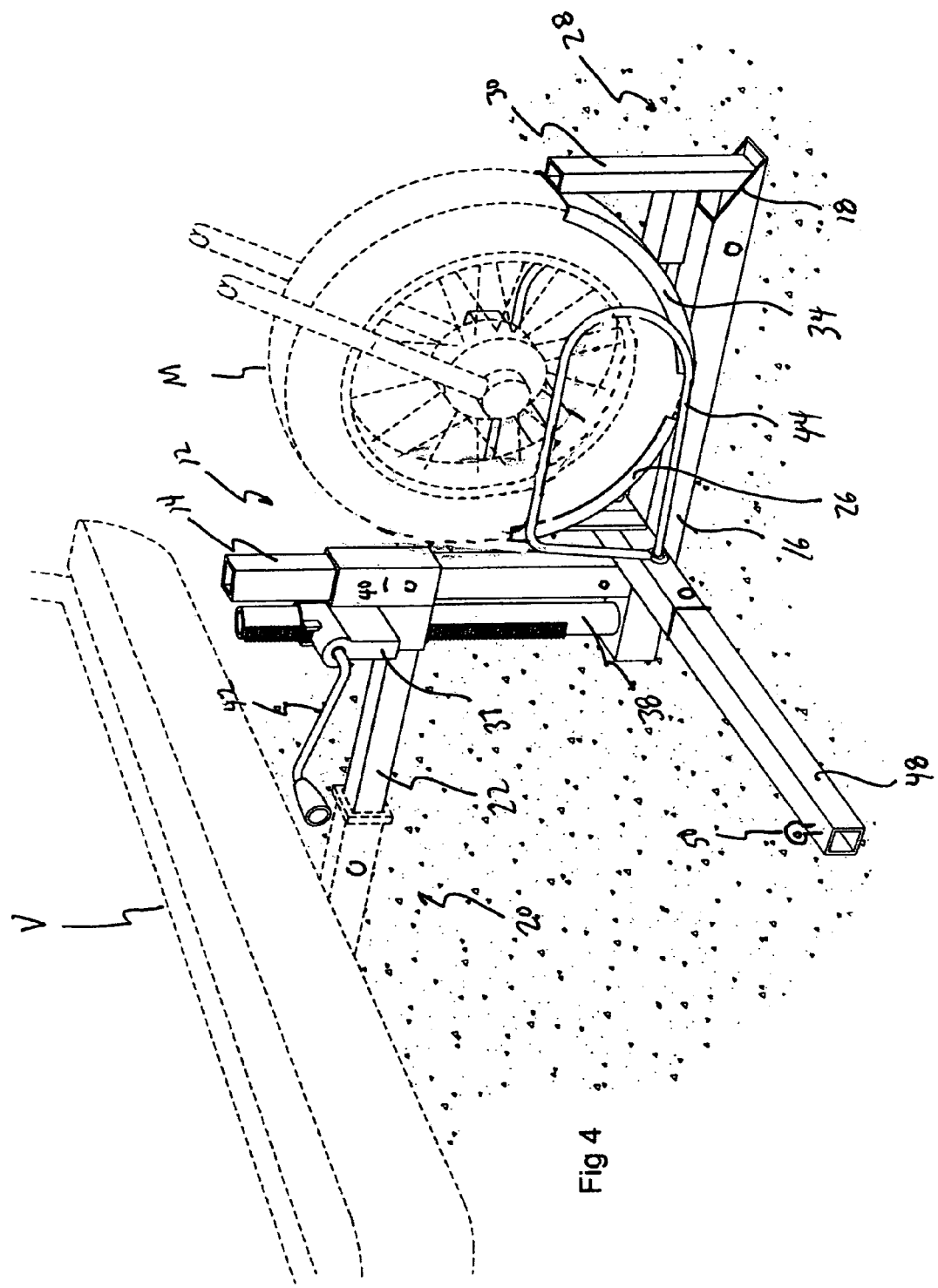
FIG. 4 is a perspective view of the vehicle towing apparatus of FIG. 1 with a motorcycle tire mounted in the motorcycle support assembly.
Figure 5:
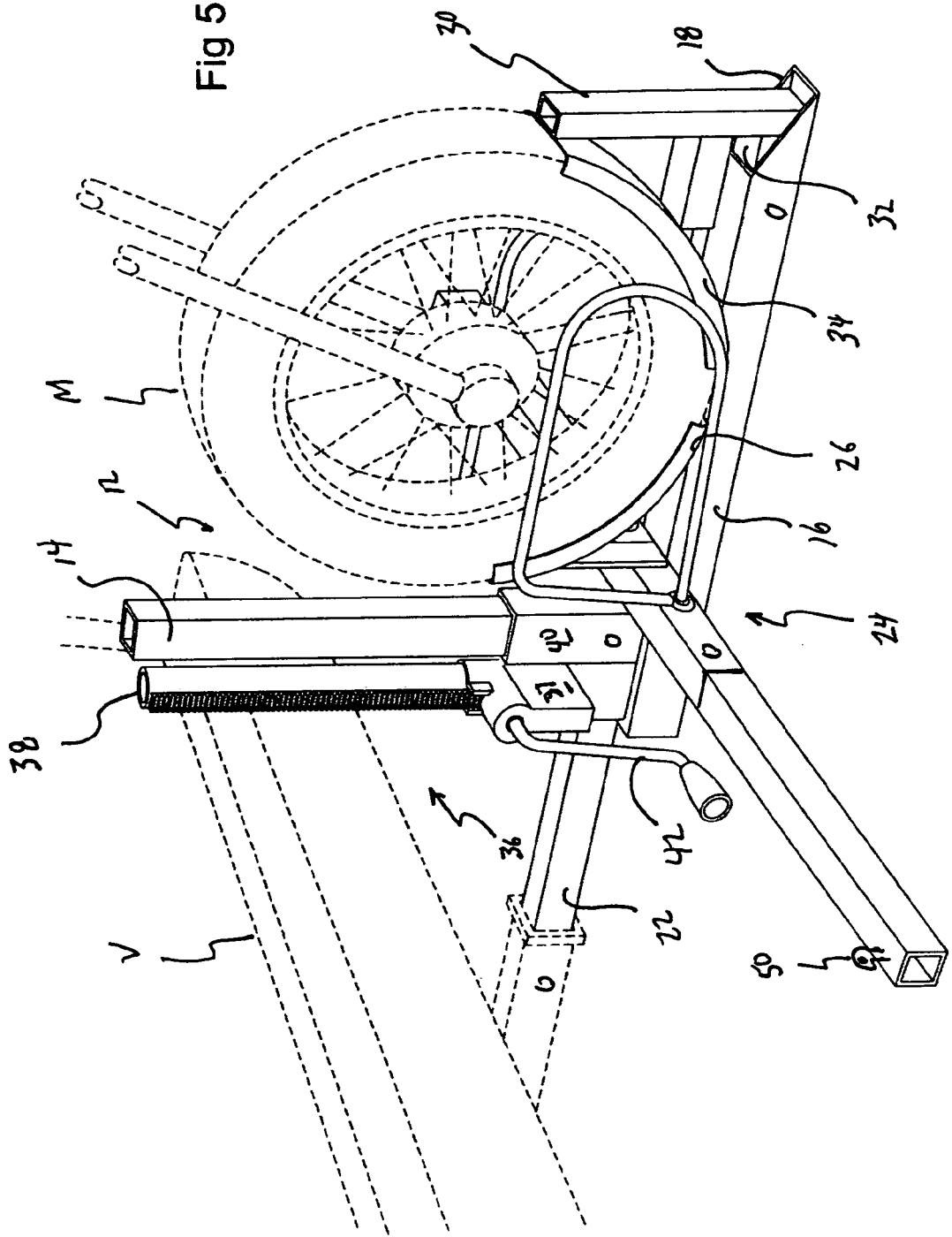
FIG. 5 is a perspective view of the vehicle towing apparatus illustrated in FIG. 1 at a raised, towing position.
Figure 6:
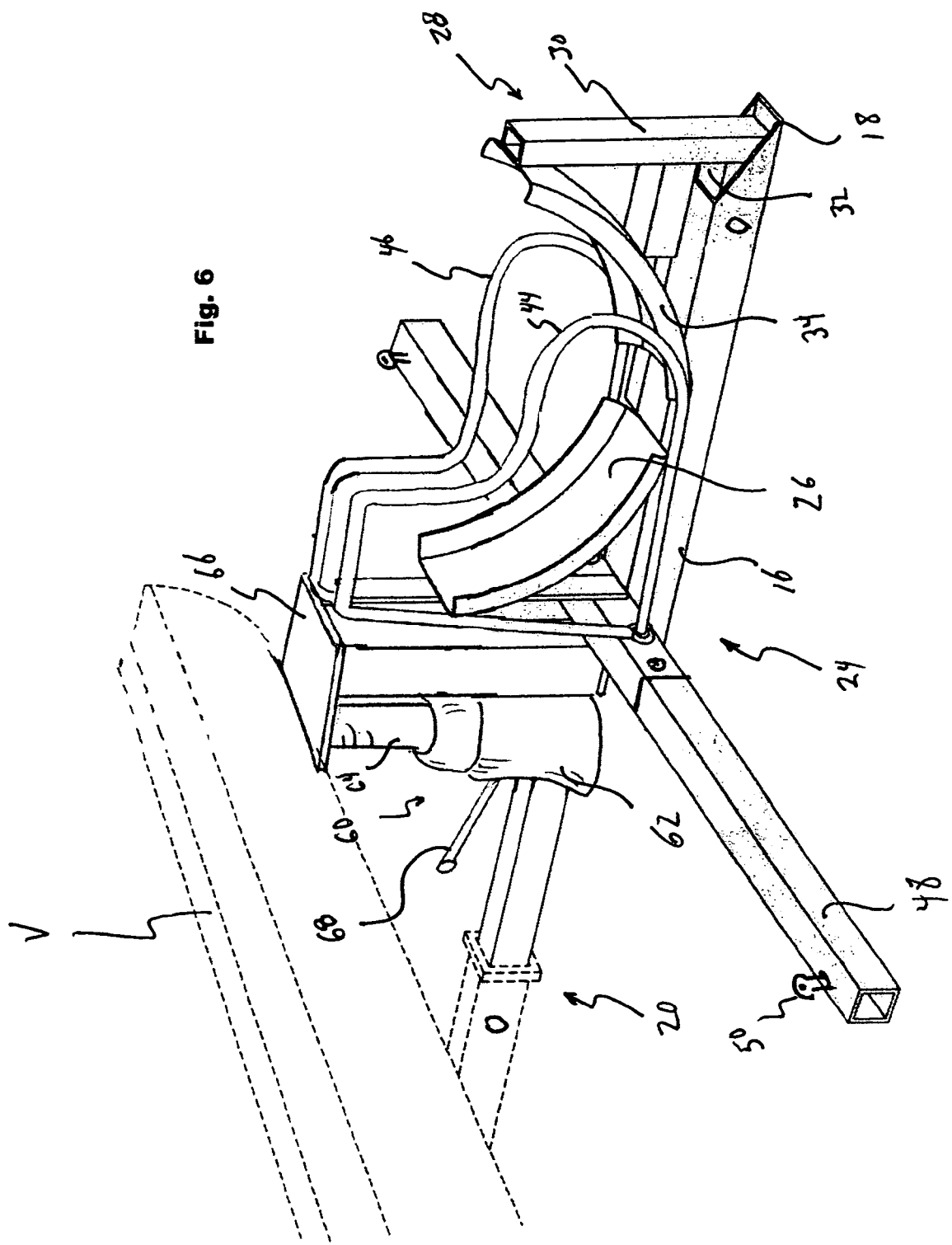
FIG. 6 is a perspective view of a second preferred embodiment of the vehicle towing apparatus illustrated in FIG. 1.

The present invention also includes a lifting assembly 36 to allow the motorcycle support assembly 24 to be driven from a position near the ground surface as illustrated in FIGS. 2–4 for loading a motorcycle and a raised position as illustrated in FIGS. 1, 5 and 6 for transporting a motorcycle or the device itself without a motorcycle. The lifting assembly 36 includes a toothed rack 38 projecting upwardly from a base adjacent the vertical support member 14, and extending in a generally parallel relationship therewith. A pinion (not shown) is encased in a housing 37 that surrounds a portion of the rack. The pinion is operated by a crank or handle 42 attached thereto. When the crank 42 is rotated, the pinion is caused to ride up the toothed rack 38.

The lifting assembly also includes a traveling support member 40 which is attached to the motorcycle support assembly 24. The traveling support member 40 is fixed to the housing 37 such that it moves therewith. Therefore, when moving the motorcycle support assembly 24 from a raised position as seen in FIG. 1 to a lowered position as seen in FIG. 2, the traveling support member 40 will track the housing 37 along the toothed rack 38 and move therewith.

A second form of the lifting assembly is illustrated generally at 60 in FIG. 6. This version of the lifting assembly 60 is formed around a bottle jack 62 which is a hydraulic jack that uses a handle 68 to generate internal pressure to move a vertical support member 64 through a predetermined distance. In the present case, the vertical support member 64 is attached to a traveling support plate 66 which is in turn attached to the motorcycle support assembly 24. As the hydraulic jack is pumped with the handle 68, fluid pressure builds and causes the vertical support member 64 to rise carrying the traveling support plate 66 and the motorcycle support assembly 24 with it.

As also seen in FIG. 6, two other versions of the siderails 44, 46 are illustrated wherein the rails are elongated and raised to provide more support area for contact with the motorcycle tire.

The present invention also includes a stabilizer bar 48 extending in a generally perpendicular manner with the horizontal support member 16. The stabilizer bar 48 is fitted with two eyelets 50 or other hooks for attachment of a bungee cord or other cord or strap that extends from the eyelets 50 at the ends of the stabilizer bar 48 to the handlebars of a motorcycle or other vehicle being towed. The stabilizer bar 48 may be formed in multiple pieces and it may also be formed to telescope into a central receiving portion at closing adjacent the motorcycle support assembly 24 so that the stabilizer bar 48 which provides the majority of the width of the towing apparatus may be disassembled from the remainder of the towing apparatus 10 for shipment or carrying in a vehicle. By removing or breaking down the stabilizer bar 48, the towing apparatus is made much narrower and is easier to pack, ship or to be transported by user.

Throughout the towing apparatus there are several square or rectangular beams which interact with one another. An example of this is the rear support assembly telescoping into the horizontal support member 16. As seen in FIG. 3, the structures are provided with holes and when the holes are in registry, conventional cotter pins or other pins may be placed therethrough to lock the device in a particular configuration. Such pins are primarily illustrated in FIG. 6 but it should be understood that the location and usefulness of such pins may be applied to any version of the device illustrated herein.

While the present invention is particularly suited to towing a single motorcycle, it will be understood that to tow more than one motorcycle, multiple vehicle support assemblies may be used by mounting such assemblies in a spaced relationship along the stabilizer bar. Further, by providing wheel supports that accommodate tires as wide as those seen on ATV's, and by spacing such supports at a distance corresponding with the width-wise wheel spacing on an ATV, four-wheeled ATV's may be towed using the present invention. Similarly, three-wheeled ATV's require a single wheel support, but any multiple wheel supports must be spaced farther apart than those used for motorcycles. Accordingly, the present invention provides a versatile towing apparatus.

In operation and with reference to FIG. 2, the motorcycle support assembly 24 is lowered to ground level by turning the crank 42 in a clockwise manner. As seen in FIG. 3, the rear support assembly is removed from the remainder of the towing apparatus. Utilizing the ramp 18, a motorcycle wheel M is rolled up the ramp 18 onto the horizontal support member 16 and the forward tire support 26. With reference to FIG. 4, the rear support assembly 28 is mated to the horizontal support member 16 and pinned in place. This should occur at a position wherein the majority of the motorcycle tire is in contact with the forward and aft support assemblies. Pins are utilized to lock the towing apparatus into the configuration once loaded. Optionally, straps may be used to extend from the end of the stabilizer bar to the motorcycle handlebars and the tire M may be lashed to the forward support assembly 24, if desired.

As a final step, the crank 42 is rotated in a clockwise manner to raise the motorcycle support assembly 24 and the front end of the motorcycle to be towed to a position off the road.

By the above, the present invention provides a towing apparatus for motorcycles and other vehicles with enhanced ease of use, enhanced ease of transportability and shipping, and improved stability.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

I claim:

1. An apparatus for towing at least one wheeled vehicle comprising:
   a frame including at least one generally vertically oriented support member and at least one generally horizontally oriented support member, said horizontal support member being at least partially hollow and formed with a ramp in a distal end thereof for enhanced ease of engaging a vehicle with said apparatus for towing;
   a mounting arrangement, mounted to said frame, for selectively mounting said frame to a towing vehicle, including a device for cooperative engagement with said towing vehicle;
   a vehicle support assembly for receiving and holding a tire, including at least one generally curved forward tire support member mounted to said horizontal frame member, and a rear support assembly, said rear support assembly including a generally L-shaped frame and a generally curved aft tire support member, said L-shaped frame configured for removable telescopic engagement with said horizontal support member; and
   a lifting assembly for moving said vehicle support assembly generally vertically between a first position for loading a vehicle and a second position for towing a vehicle.

2. An apparatus for towing at least one vehicle according to claim 1 wherein said forward tire support member and said aft tire support member are each formed with a curvature approximating a tire curvature.

3. An apparatus for towing at least one vehicle according to claim 1 and further comprising first and second side rails mounted to said horizontal support member with said forward tire support member therebetween for enhanced stability during vehicle support.

4. An apparatus for towing at least one vehicle according to claim 1 and further comprising a stabilizer bar extending horizontally across said frame along an imaginary line substantially normal to said horizontal support member configured for receiving at least one stabilizing cord extending between a vehicle and said stabilizer bar.

5. An apparatus for towing at least one vehicle according to claim 4 wherein said stabilizer bar is formed in multiple, telescoping sections for releasably fastening said stabilizer bar at a predetermined length.

6. An apparatus for towing at least one vehicle according to claim 4 and further comprising a second vehicle support assembly mounted to said stabilizer bar.

7. An apparatus for towing at least one vehicle according to claim 6 and further comprising a third vehicle support assembly mounted to said stabilizer bar.

8. An apparatus for towing at least one vehicle according to claim 1 wherein said lifting assembly includes a toothed rack mounted to said horizontal support member and extending in a generally parallel relationship with said vertical support member, a traveling support member mounted to said toothed rack, said traveling support member including a housing and at least one pinion disposed within said housing for operational engagement with said toothed rack, and a handle fixed to said pinion for manual rotation thereof to drive said pinion along said rack to selectively move said traveling support member with said horizontal support member and said vehicle support assembly vertically between said loading position and said towing position.

9. An apparatus for towing at least one vehicle according to claim 1 wherein said lifting assembly includes a traveling support member attached to said horizontal support member and a fluid operated piston and cylinder arrangement operatively connected to said traveling support member to selectively move said traveling support member with said horizontal support member and said vehicle support assembly vertically between said loading position and said towing position.

10. An apparatus for towing at least one motorcycle comprising:
    a frame including at least one generally vertically oriented support member and at least one generally horizontally oriented support member,
    a mounting arrangement, mounted to said frame, for selectively mounting said frame to a towing vehicle, including a device for cooperative engagement with said towing vehicle;
    a motorcycle support assembly for receiving and holding a motorcycle tire, including at least one generally curved forward tire support member mounted to said horizontal frame member, and a rear support assembly, said rear support assembly including a generally L-shaped frame and a generally curved aft tire support member, said L-shaped frame configured for removable telescopic receipt in said horizontal support member; and
    a lifting assembly including a toothed rack mounted to said horizontal support member and extending in a generally parallel relationship with said vertical support member, a traveling support member mounted to said toothed rack, said traveling support member including a housing and at least one pinion disposed within said housing for operational engagement with said toothed rack, and a handle fixed to said pinion for manual rotation thereof to drive said pinion along said rack to selectively move said motorcycle support assembly generally vertically between a loading position and a towing position.

11. An apparatus for towing at least one vehicle according to claim 10 wherein said horizontal support member is at least partially hollow and formed with a ramp in a distal end thereof for enhanced ease of engaging a vehicle with said towing apparatus for towing.

12. An apparatus for towing at least one motorcycle according to claim 10 wherein said forward tire support member and said aft tire support member are each formed with a curvature approximating a motorcycle tire curvature.

13. An apparatus for towing at least one motorcycle according to claim 10 and further comprising first and second side rails mounted to said horizontal support member with said forward tire support member therebetween for enhanced motorcycle support.

14. An apparatus for towing at least one motorcycle according to claim 10 and further comprising a stabilizer bar extending horizontally across said frame along an imaginary line substantially normal to said horizontal support member configured for receiving at least one stabilizing cord extending between a motorcycle and said stabilizer bar.

15. An apparatus for towing at least one motorcycle comprising:
    a frame including at least one generally vertically oriented support member and at least one generally horizontally oriented support member, a mounting arrangement, mounted to said frame, for selectively mounting said frame to a towing vehicle, including a device for cooperative engagement with said towing vehicle;

a motorcycle support assembly for receiving and holding a motorcycle tire, including at least one generally curved forward tire support member mounted to said horizontal frame member, and a rear support assembly, said rear support assembly including a generally L-shaped frame and a generally curved aft tire support member, said L-shaped frame configured for removable telescopic receipt in said horizontal support member; and a lifting assembly including a traveling support member attached to said horizontal support member and a fluid operated piston and cylinder arrangement operatively connected to said traveling support member to selectively move said motorcycle support assembly generally vertically between a loading position and a towing position.

16. An apparatus for towing at least one motorcycle according to claim 15 wherein said horizontal support member is at least partially hollow and formed with a ramp in a distal end thereof for enhanced ease of positioning a motorcycle on said towing apparatus for towing.

17. An apparatus for towing at least one vehicle according to claim 15 wherein said forward tire support member and said aft tire support member are each formed with a curvature approximating a motorcycle tire curvature.

18. An apparatus for towing at least one motorcycle according to claim 15 and further comprising first and second side rails mounted to said horizontal support member with said forward tire support member therebetween for enhanced motorcycle support.

19. An apparatus for towing at least one motorcycle according to claim 15 and further comprising a stabilizer bar extending horizontally across said frame along an imaginary line substantially normal to said horizontal support member configured for receiving at least one stabilizing cord extending between a motorcycle and said stabilizer bar.

* * * * *